(12) United States Patent
McDaniel (10) Patent No.: US 7,055,085 B2
(45) Date of Patent: May 30, 2006

(54) SYSTEM AND METHOD FOR PROTECTING HEADER INFORMATION USING DEDICATED CRC

(75) Inventor: Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 573 days.

(21) Appl. No.: 10/378,803

(22) Filed: Mar. 4, 2003

(65) Prior Publication Data

US 2003/0169738 A1    Sep. 11, 2003

Related U.S. Application Data

(60) Provisional application No. 60/362,729, filed on Mar. 7, 2002.

(51) Int. Cl.
    *H03M 13/09* (2006.01)
(52) U.S. Cl. .................................................. 714/776
(58) Field of Classification Search ................. 714/776
    See application file for complete search history.

(56) References Cited

U.S. PATENT DOCUMENTS

| | | | | | |
|---|---|---|---|---|---|
| 5,579,503 | A | * | 11/1996 | Osborne | 711/119 |
| 5,933,430 | A | * | 8/1999 | Osakabe et al. | 370/463 |
| 6,009,547 | A | * | 12/1999 | Jaquette et al. | 714/758 |
| 6,212,633 | B1 | * | 4/2001 | Levy et al. | 713/153 |
| 6,219,697 | B1 | * | 4/2001 | Lawande et al. | 709/221 |
| 6,603,737 | B1 | * | 8/2003 | Fukunaga et al. | 370/229 |
| 6,944,763 | B1 | * | 9/2005 | Asano et al. | 713/168 |
| 6,959,410 | B1 | * | 10/2005 | Hata et al. | 714/746 |
| 2002/0051445 | A1 | * | 5/2002 | Drottar et al. | 370/362 |
| 2002/0162102 | A1 | * | 10/2002 | Ihara | 725/9 |
| 2004/0123221 | A1 | * | 6/2004 | Huffman et al. | 714/776 |

OTHER PUBLICATIONS

IEEE Std 1394-1995; IEEE standard for a high performance serial bus; Aug. 30, 1996; The Institute of Electrical And Electronics Engineers, Inc.; pp. 147, 150-151.*

* cited by examiner

*Primary Examiner*—R. Stephen Dildine
(74) *Attorney, Agent, or Firm*—McAndrews, Held & Malloy, Ltd.

(57) ABSTRACT

Systems and methods that protect heading information using a dedicated cyclic redundancy check (CRC) are provided. In one embodiment, a method that transmits a data packet may include, for example, one or more of the following: creating a header CRC by performing a CRC process on header information, the header information indicating where to place data information; separately creating a data CRC by performing the CRC process on the data information; and forming a data packet including, for example, the header information, the header CRC, the data information and the data CRC.

38 Claims, 5 Drawing Sheets

SYSTEM AND METHOD FOR PROTECTING HEADER INFORMATION USING DEDICATED CRC

RELATED APPLICATION

This application makes reference to, claims priority to and claims benefit from U.S. Provisional Patent Application Ser. No. 60/362,729, entitled "System and Method of Protecting RDMA Header Information Using Dedicated CRC" and filed on Mar. 7, 2002.

INCORPORATION BY REFERENCE

The above-referenced United States patent application is hereby incorporated herein by reference in its entirety.

BACKGROUND OF THE INVENTION

Conventional systems and conventional methods send data packets that each have a header portion, a data portion and possibly a cyclic redundancy check (CRC) portion. In some conventional systems and methods, the CRC portion is the result of the performance of a CRC process on the data portion. Accordingly, if the header portion is corrupted, the data portion, which may be errorless, will be stored in the wrong memory location. In some cases, a critical system memory location may be mistakenly overwritten leading to system failures.

Further limitations and disadvantages of conventional and traditional approaches will become apparent to one of ordinary skill in the art through comparison of such systems with at least some aspects of the present invention as set forth in the remainder of the present application with reference to the drawings.

BRIEF SUMMARY OF THE INVENTION

Aspects of the present invention may be found, for example, in systems and methods that protect header information. In one embodiment, the present invention may provide a method that transmits a data packet. The method may include, for example, one or more of the following: creating a header CRC by performing a cyclic redundancy check (CRC) process on header information, the header information indicating where to place data information; separately creating a data CRC by performing the CRC process on the data information; and forming a data packet including, for example, the header information, the header CRC, the data information and the data CRC.

In another embodiment, the present invention may provide a method that processes a data packet. The method may include, for example, one or more of the following: receiving a data packet, the data packet including, for example, header information and data information, the header information indicating where in a host memory to place the data information and being protected by a header CRC, the data information being protected by a data CRC; and separating the header information from the data information of the data packet.

In another embodiment, the present invention may provide a data packet. The data packet may include, for example, a data portion, a CRC data portion, a header portion and a CRC header portion. The CRC data portion may be related to a performance of a CRC process on the data portion. The header portion may include, for example, information relating to a memory location of a memory in which to place the data portion. The CRC header portion may be related to the performance of the CRC process on the header portion. The CRC data portion and the CRC header portion may be separate.

In another embodiment, the present invention may provide a system that protects header information. The system may include, for example, a command unit, a memory and a network interface card (NIC). The NIC may be coupled to the command unit and to the memory. The command unit may provide destination information to the NIC. The memory may provide data information to the NIC. The NIC may generate a header CRC by performing a CRC process on the destination information and a data CRC by performing the CRC process on the data information. The NIC may form a data packet based upon at least the data information, the data CRC, the destination information and the header CRC.

In yet another embodiment, the present invention may provide a system that handles data packets. The system may include, for example, a NIC and a memory coupled to the NIC. The NIC may receive a data packet and may separate the header information from data information of the data packet. The header information may indicate in which memory location of the memory to place the data information.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may be found, for example, in systems and methods that employ a first cyclic redundancy check (CRC) to protect control information and a second CRC to protect data information. The first CRC and the second CRC may be employed, for example, on a per packet basis. In some embodiments, the present invention may provide that data information carried by packets transported via a network may be placed directly into, for example, a temporary memory, upper layer protocol (ULP) memory or an application memory residing in a destination host memory. The direct placement of data information into the destination host memory may be facilitated, for example, via a flow-through network interface card (NIC). In some embodiments, the present invention may provide direct data placement (DDP) over a transport protocol such as, for example, transmission control protocol (TCP).

Figure 1:
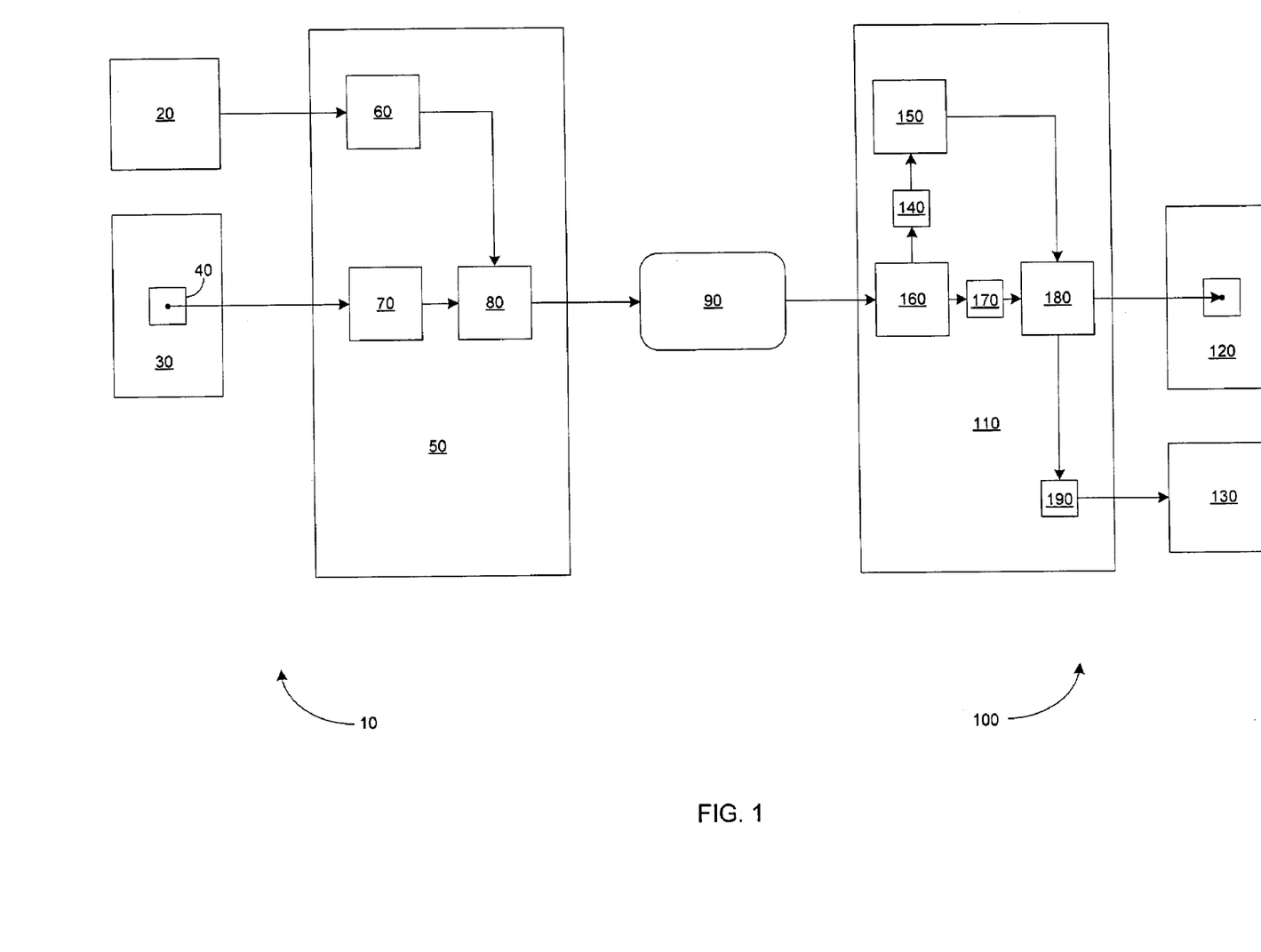
FIG. 1 shows a block representation illustrating an example of a first system connected to a second system via a network according to the present invention.

FIG. 1 shows a block representation illustrating an embodiment of a first system coupled to a second system via a network according to the present invention. The first system 10 may include, for example, a command unit 20, a memory 30 having data 40 and a NIC 50. The NIC 50 may include, for example, a header processor 60, a data movement module 70 and a combiner 80. The first system 10 also may include other components and circuits which are not shown, but are well known to one skilled in the art. As illustrated, the command unit 20 is coupled to the header processor 60 which, in turn, is coupled to the combiner 80. The memory 30 is coupled to the data movement module 70 which, in turn, is coupled to the combiner 80. The combiner 80 is coupled to a network 90 (e.g., the Internet, an Ethernet, a local access network (LAN), a wide area network (WAN), a wireless network, etc.) Couplings between components may be achieved via a wired connection (e.g., wires, cables, etc.) or via a wireless connection.

The second system 100 may include, for example, a NIC 110, a memory 120 and a system task monitor 130. The NIC 110 may include, for example, a header CRC unit 140, a header processor 150, a buffer 160, a data CRC unit 170, a data movement module 180 and a NIC task monitor 190. As illustrated, the network 90 is coupled to the NIC 110 via the buffer 160. The buffer 160 is coupled to the header CRC unit 140 which, in turn, is coupled to the header processor 150. The header processor 150 is coupled to the data movement module 180. The buffer 160 is also coupled to the data CRC unit 170 which, in turn, is coupled to the data movement module 180. Although shown as separate modules, the present invention may contemplate different degrees of integration between components. For example, the CRC unit 140 and the CRC unit 170 can be integrated with the header processor 150 and the data movement module 180, respectively. The data movement module 180 is coupled to the NIC task monitor 190 which, in turn, is coupled to the system task monitor 130. The data movement module 180 is also coupled to the memory 120. The present invention may also contemplate other couplings other than or instead of those described herein.

Figure 2:
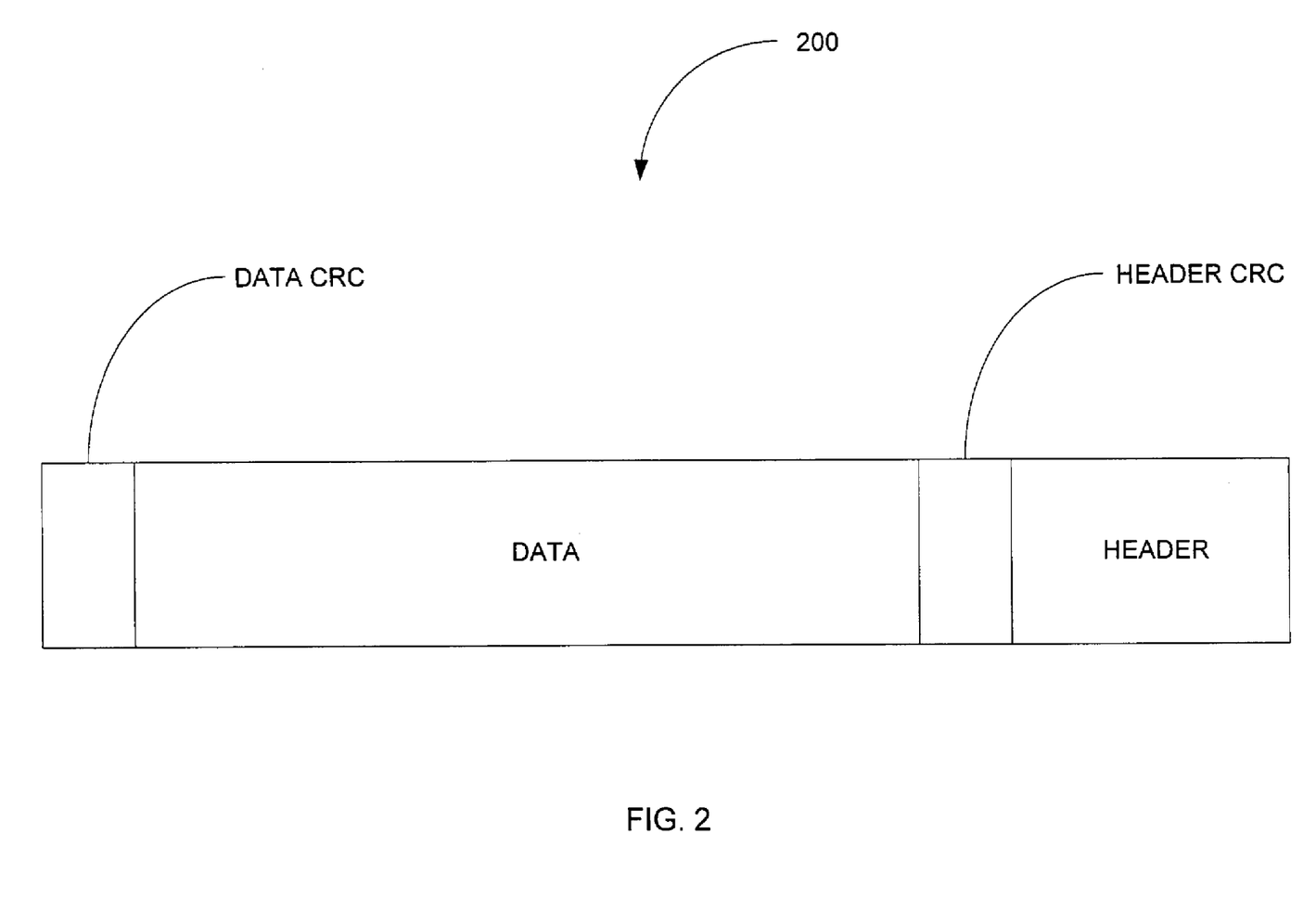
FIG. 2 shows a representation of an example of a data packet according to the present invention.
Figure 3:
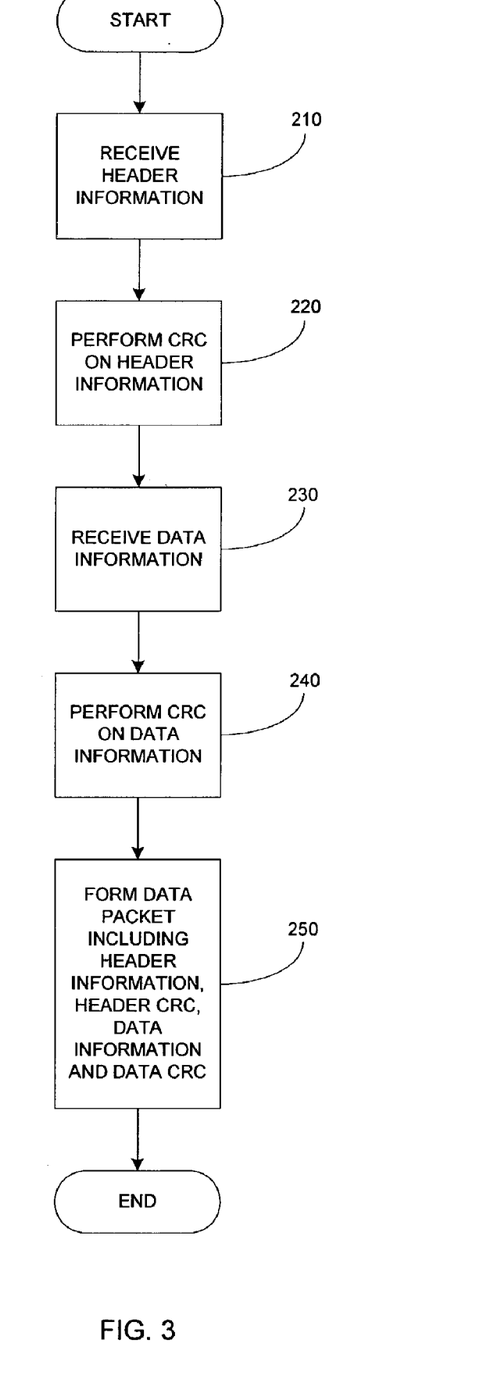
FIG. 3 shows a flowchart illustrating an example of a process that is used in transporting data according to the present invention.
Figure 4:
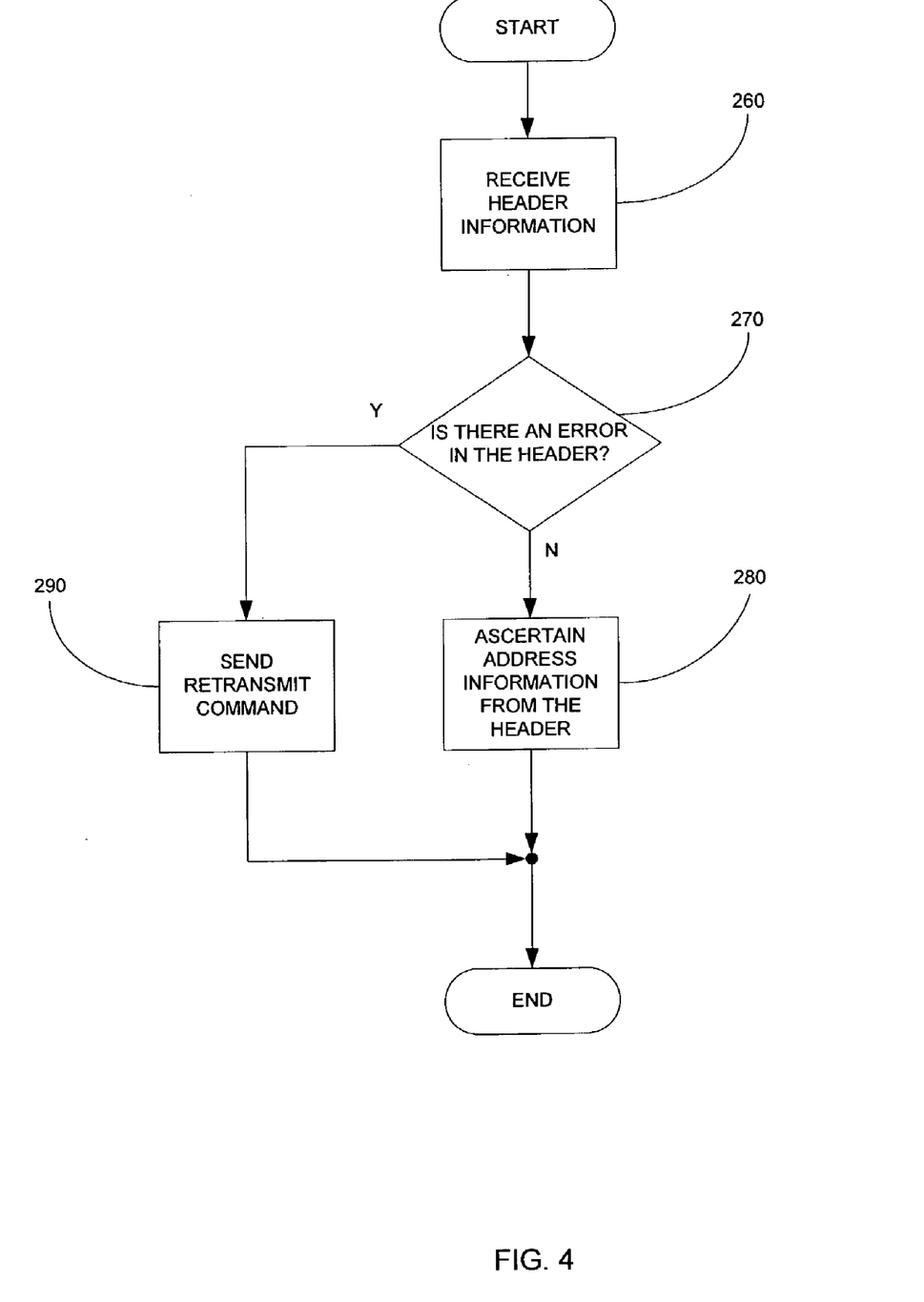
FIG. 4 shows a flowchart illustrating an example of a process that is used in transporting data according to the present invention.
Figure 5:
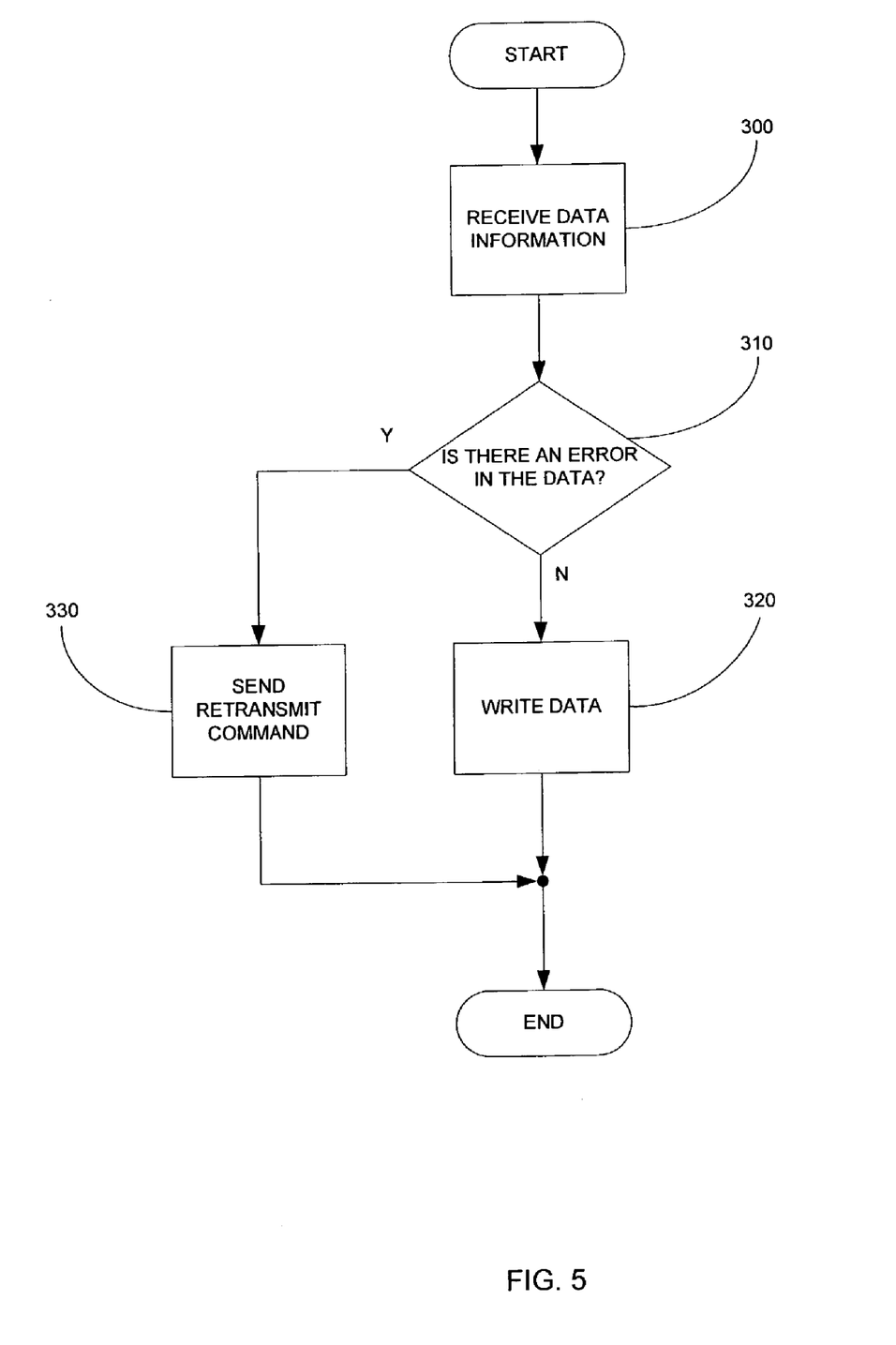
FIG. 5 shows a flowchart illustrating an example of a process that is used in transporting data according to the present invention.

FIGS. 3–5 show flowcharts illustrating embodiments of processes that may be used in transporting data from a first system to a second system according to the present invention. In operation, in step 210, the command unit 20 in the first system 10 initiates a data transfer by providing the header processor 60 with a data transfer command and may provide an address (e.g., DDP information) to which the data can be transferred. In step 220, the header processor 60 performs a CRC process and adds the CRC result to the header data stream. In step 230, the data to be transferred is transported from the memory 30 to the data movement module 70 of the NIC 50. In step 240, the data movement module 70 performs a CRC process and adds the CRC result to the data stream. Although not shown as separate units, the performance of the CRC by the header processor 60 or the performance of the CRC by the data movement module 70 may have been provided by separate or pooled CRC units. In step 250, the combiner 80 puts together the header information received from the header processor 60 (e.g., the address information, the header CRC, etc.) with the data information received from the data movement module 70 (e.g., the data, the data CRC, etc). In one embodiment, the two data streams may be concatenated into a data packet 200 as illustrated in FIG. 2. In another embodiment, the two data streams may be concatenated in a different order than as illustrated in FIG. 2. In some embodiments, each packet may be fully describing (e.g., self describing) such that the second system 100 (e.g., the NIC 110 of the second system 100) can process each packet independent of any other packet. Some of the above-described steps may be performed in parallel. For example, the CRC processes may be performed in parallel, thereby speeding up the process.

In one embodiment, the header processor 60 may work with the combiner 80 and the data movement module 70 in forming packets that may comply with, for example, any length restrictions imposed, for example, by the network 90. For example, the header processor 60, the combiner 80 and the data movement module 70 may break up a requested data transfer into a plurality of data blocks so as to meet, for example, any network length restrictions. The header processor 60 may be adapted to provide a header and header CRC for each packet sent via the network 90. In one embodiment, each header in each packet may independent and may fully describe its respective packet, which is part of a complete data transfer requested by the command unit 20. The data movement module 70 may break up data information into data blocks using a similar algorithm as the header processor 60. Accordingly, each data block may be associated (e.g., concatenated) with a respective independent header (e.g., a self-describing header).

The data packet 200 is routed via the network 90 before being received by the second system 100 via, for example, the buffer 160 of the NIC 110. The buffer 160 may parse each received packet, thereby separating the control information (e.g., the header information) from the data information. In step 260, header information is received by the header CRC unit 140. In query 270, the header of the data packet 200 is checked for errors via a CRC algorithm in the header CRC unit 140. Subsequently, if there were no errors in the header, then, in step 280, the header processor 150 processes the header and determines a local memory address in memory 120 (e.g., host memory) which is forwarded to the data movement module 180. If there was an error, then, in step 290, the data transfer process is terminated and a retransmit command is sent to the first system 10. The error may also be indicated to the system task monitor 130, which may facilitate a retransmission. Such an example of a transport process may have an advantage in that information is written in only the correct memory location of the memory 120 of the second system 100. Thus, critical systems may not be mistakenly overwritten if the local memory address is in error. In addition, since the retransmit command is sent early in the process if the header has errors, the process may provide for less delay and faster transport rates. Furthermore, since the dropping may be done before layer 4 (L4) transport process has been completed, the dropped data may be retransmitted using the mechanisms of L4 transport processing as opposed to using higher levels of protocol.

The processing of the data information may be conducted at least partially in parallel with the processing of the header information. Employing such a parallel architecture may provide, for example, efficiencies in time. In step 300, data information is received by the data CRC unit 170. In query 310, the data portion of the data packet 200 is checked for errors via a CRC algorithm in the data CRC unit 170. If the data CRC does not indicate an error, then, in step 320, the data movement module 180 takes the presumably correct local memory address information from the header processor 150 and the data from the data packet and writes the data at the prescribed local memory address of the memory 120. The NIC task monitor 190 may also notify the system task monitor 130 that the task is complete. If the data CRC indicates an error, then the NIC task monitor 190 may notify the system task monitor 130 that the task is not complete and may request that the data packet be retransmitted by the first system 10.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for transmitting a data packet, comprising:
   creating a header CRC by performing a cyclic redundancy check (CRC) process on header information, the header information indicating where in memory to place data information;
   separately creating a data CRC by performing the CRC process on the data information; and
   forming a data packet comprising the header information, the header CRC, the data information and the data CRC.

2. The method according to claim 1, wherein the data packet is transmitted onto a network.

3. The method according to claim 2, wherein the data packet complies with any length restrictions in the network.

4. The method according to claim 1, wherein the header information, the header CRC, the data information and the data CRC are concatenated to form the data packet.

5. The method according to claim 1, further comprising:
   receiving the transmitted data packet; and
   separating control information from the data information of the data packet.

6. The method according to claim 5, wherein the control information comprises header information.

7. The system of claim 1, wherein the header information comprises a first header portion comprising information indicating where in memory to place data information and a second header portion, and creating the header CRC comprises performing the CRC process on the first header portion and not the second header portion.

8. A method for processing a data packet, comprising:
   receiving a data packet the data packet, comprising header information and data information, the header information indicating where in a host memory to place the data information and being protected by a header CRC, the data information being protected by a data CRC; and
   separating the header information from the data information of the data packet.

9. The method according to claim 8, further comprising: processing the header information in parallel with the data information.

10. The method according to claim 9, wherein the header information is processed separately from the data information.

11. The method according to claim 8, further comprising:
    performing a CRC process on the header information; and
    if the CRC process on the header information indicates an error in the header information, then requesting a retransmission of the data packet.

12. The method according to claim 8, further comprising:
    performing a CRC process on the data information; and
    if the CRC process on the data information indicates an error in the data information, then requesting a retransmission of the data packet.

13. The method according to claim 12, wherein if the CRC process on the data information indicates the error in the data information, then the retransmission request is passed on to a control processor.

14. The method according to claim 8, further comprising:
    performing a CRC process on the header information to determine whether there is an error in the header information.

15. The method according to claim 8, further comprising:
    performing a CRC process on the data information;
    performing the CRC process on the header information; and
    if both the CRC process on the data information and the CRC process on the header information indicate no error, then directly writing the data information at a memory location associated with a memory address based upon the header information.

16. The method of claim 8, wherein the header information comprises a first header portion comprising information indicating where in a host memory to place the data information and a second header portion, and the header CRC was created by performing the CRC process on the first header portion and not the second header portion.

17. A data packet, comprising:
    a data portion;
    a CRC data portion that is related to a performance of a CRC process on the data portion;
    a header portion comprising a first header portion and a second header portion, the first header portion comprising information relating to a memory location of a memory in which to place the data portion; and
    a CRC header portion that is related to the performance of the CRC process on the first header portion and not the second header portion,
    wherein the CRC data portion and the CRC header portion are separate.

18. A system for protecting header information, comprising:
    a command unit;
    a memory; and
    a network interface card (NIC) coupled to the command unit and to the memory,
    wherein the command unit provides destination information to the NIC,
    wherein the memory provides data information to the NIC,
    wherein the NIC generates a header CRC by performing a CRC process on the destination information,
    wherein the NIC generates a data CRC by performing the CRC process on the data information, and
    wherein the NIC forms a data packet based upon at least the data information, the data CRC, the destination information and the header CRC.

19. The system according to claim 18, wherein the NIC comprises a header processor, a data movement module and a combiner, the combiner being coupled to the header processor and to the data movement module.

20. The system according to claim 19, wherein the combiner forms the data packet.

21. The system according to claim 20, wherein the combiner concatenates the destination information, the header CRC, the data information and the data CRC.

22. The system according to claim 19, wherein the data movement module performs the CRC process on the received data information.

23. The system according to claim 19, wherein the header processor performs the CRC process on die destination information.

24. A system that handles data packets, comprising:
a NIC; and
a memory coupled to the NIC,
wherein the NIC receives a data packet comprising header information and data information,
wherein the NIC separates the header information from the data information, and
wherein the header information indicates in which memory location of the memory to place the data information.

25. The system according to claim 24, wherein the NIC comprises a buffer, a header processor adapted to receive packet header information from a received data packet and a data movement module adapted to receive packet data information from a received data packet.

26. The system according to claim 24, wherein The NIC provides transmission control protocol (TCP) processing.

27. The system according to claim 24, wherein the data packet is part of a byte stream.

28. The system according to claim 24, wherein the NIC facilitates direct placement of data information into the memory.

29. The system according to claim 24,
wherein a first CRC unit of the NIC performs a CRC process on the header information to determine if the header information has a header error,
wherein a second CRC unit of the NIC separately performs the CRC process on the data information to determine if the data information has a data error, and
wherein, if both the destination information and the data information are errorless, then the NIC writes the data information directly to a memory location associated with a memory address, the memory address being a function of the header information.

30. The system of claim 29, wherein the first CRC unit and the second CRC unit perform respective CRC processes in parallel.

31. The system of claim 30, wherein the NIC is adapted to terminate the data transfer process if processing by the first CRC unit indicates that there is an error in the header.

32. The method of claim 24, wherein the header information comprises destination information, and the NIC performs a CRC process on the destination information.

33. A system for protecting header information, comprising:
a command unit;
a memory; and
a network interface card (NIC) coupled to the command unit and to the memory, the NIC comprising: a header processor, a data movement module and a combiner coupled to the header processor and the data movement module;
wherein:
the command unit provides destination information to the NIC;
the memory provides data information to the NIC;
the NIC generates a header CRC by performing a CRC process on at least the destination information;
the data movement module of the NIC generates a data CRC by performing the CRC process on at least the data information, and
the NIC forms a data packet based upon at least the data information, the data CRC, the destination information and the header CRC.

34. The system of claim 33, wherein the header processor generates the header CRC by performing a CRC process on the destination information.

35. The system of claim 33, wherein the NIC facilitates direct placement of data information into the memory.

36. The system of claim 33, wherein the header processor generates the header CRC in parallel with the data movement module generating the data CRC.

37. The system of claim 33, wherein the combiner forms the data packet.

38. The system of claim 37, wherein the combiner concatenates the header information, the header CRC, the data information and the data CRC.

\* \* \* \* \*

UNITED STATES PATENT AND TRADEMARK OFFICE
CERTIFICATE OF CORRECTION

PATENT NO. : 7,055,085 B2  Page 1 of 1
APPLICATION NO. : 10/378803
DATED : May 30, 2006
INVENTOR(S) : Scott S. McDaniel It is certified that error appears in the above-identified patent and that said Letters Patent is hereby corrected as shown below:

Column 5, line 47 delete "packet the data packet," and insert --packet, the data packet--.
Column 7, line 5 delete "die" and insert --the--.

Signed and Sealed this

Third Day of April, 2007

JON W. DUDAS
*Director of the United States Patent and Trademark Office*